United States Patent [19]

Plumley

[11] Patent Number: 4,877,069

[45] Date of Patent: Oct. 31, 1989

[54] CUTTING TABLE

[76] Inventor: Stephen C. Plumley, 5312 Gallatin St., Hyattsville, Md. 20781

[21] Appl. No.: 194,981

[22] Filed: May 17, 1988

[51] Int. Cl.$^4$ ............................................. B25H 1/00
[52] U.S. Cl. .................................. 144/286 R; 83/574; 83/859; 182/132; 269/901
[58] Field of Search .............. 83/859, 574, 745, 471.3, 83/486.1, 471.2; 144/286 R, 286 A, 287; 182/132, 150; 269/303, 901; 248/238, 235

[56] References Cited

U.S. PATENT DOCUMENTS

| | | | |
|---|---|---|---|
| 979,220 | 12/1910 | Taber | 182/132 X |
| 1,084,496 | 1/1914 | Smith | 182/132 X |
| 2,684,275 | 7/1954 | Guth et al. | 144/287 X |
| 3,896,692 | 7/1975 | Stubbs | 83/471.3 |
| 3,931,751 | 1/1976 | Simonson | 83/859 |
| 3,935,777 | 2/1976 | Bassett | 83/471.3 |
| 3,955,456 | 5/1976 | Van Cleave | 83/471.3 |
| 4,327,619 | 5/1982 | McNamee, Jr. | 83/471.3 |

Primary Examiner—Douglas D. Watts
Assistant Examiner—Eugenia A. Jones
Attorney, Agent, or Firm—Richard C. Litman

[57] ABSTRACT

A portable foldable sawing machine table and stand assembly which includes structural details and arrangements of parts which provide facilities for usage both on the ground and on scaffolding. The invention incorporates a sawing table with movable saw guide tracks adapted to movably retain a normally hand-held, portable electric motor-driven circular saw for rapid and precise angular cross-cutting of work pieces and in case of scaffold mounting of the table and stand provides for elevation of the table assembly with variations in elevational movement of the scaffold to which it may be releasably yet rigidly attached thereby providing convenience, and added safety for a workman applying structural materials to the vertical faces, for example, of a building structure.

6 Claims, 4 Drawing Sheets

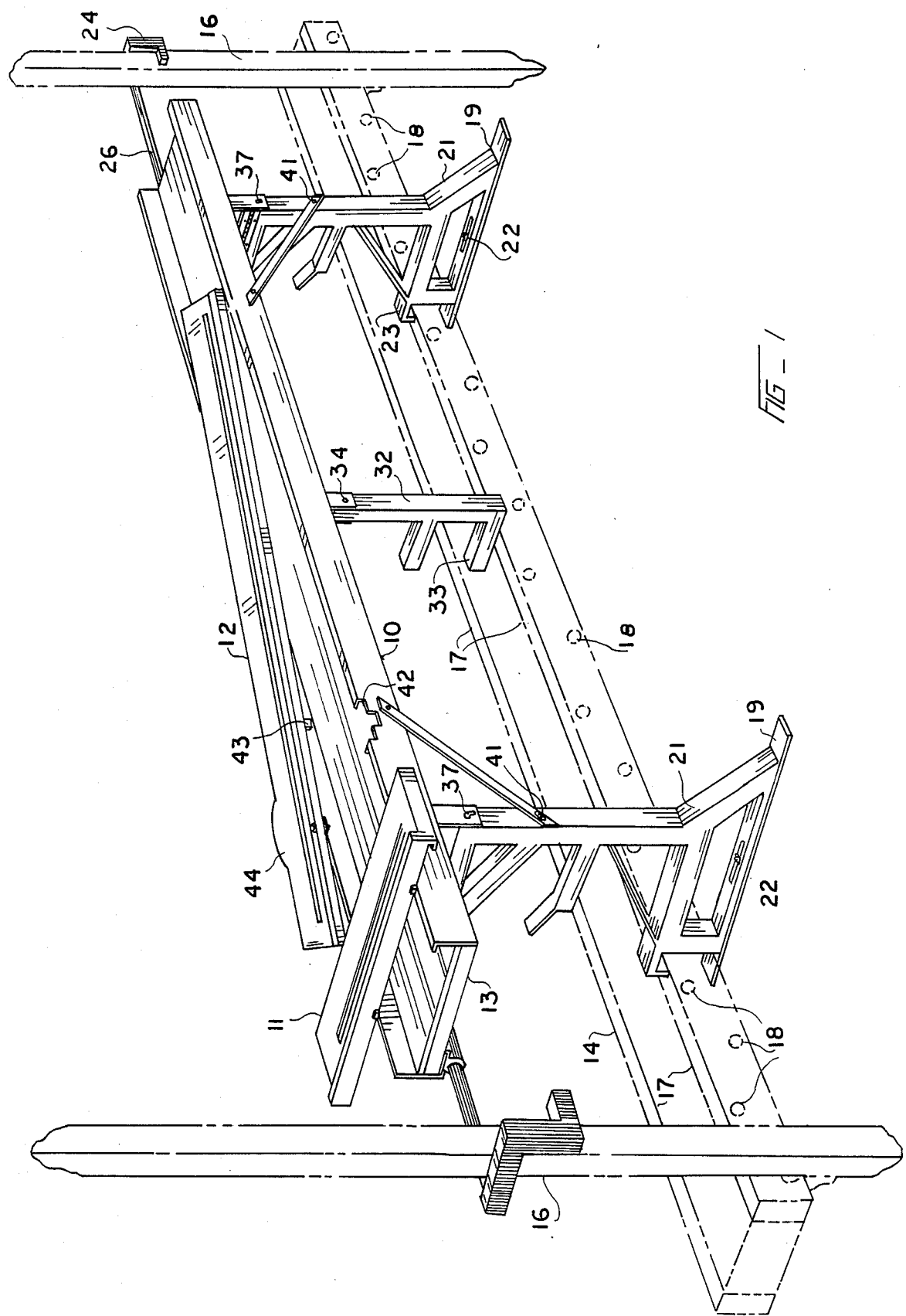

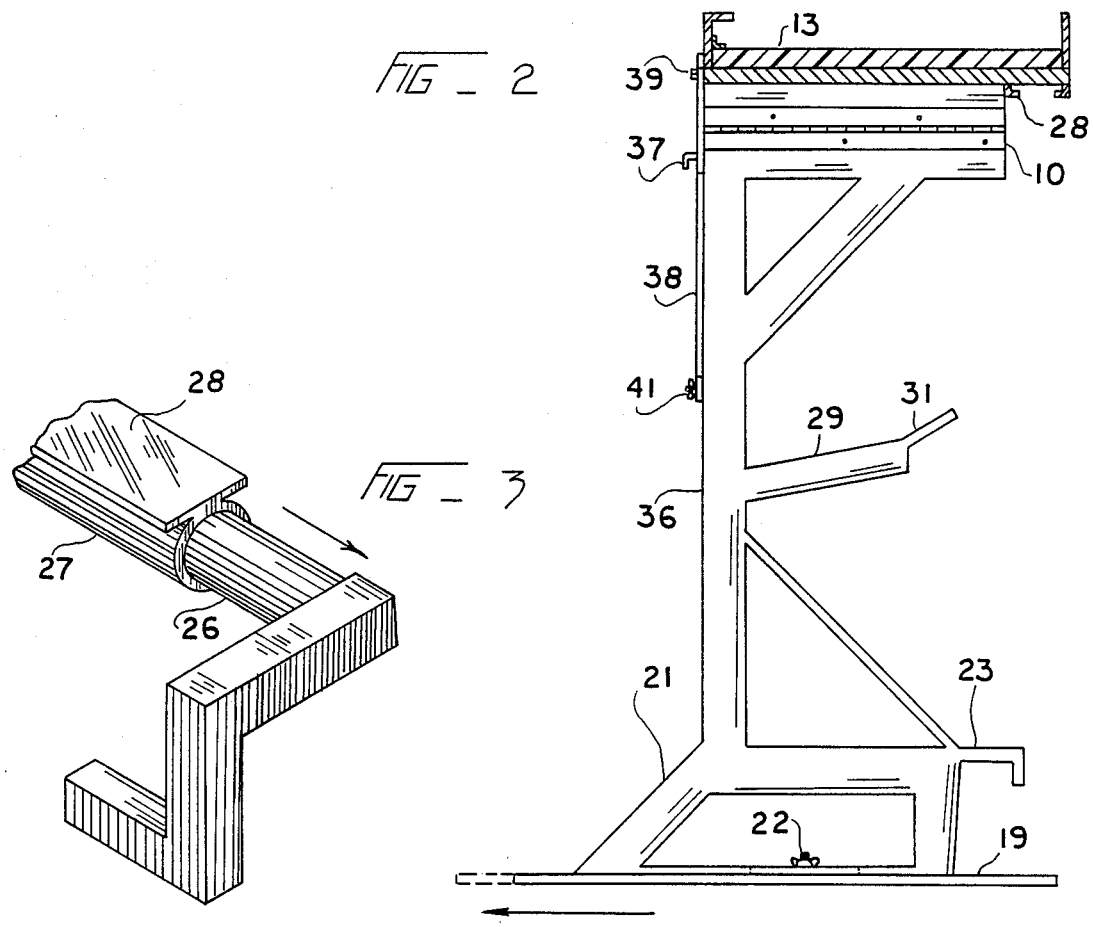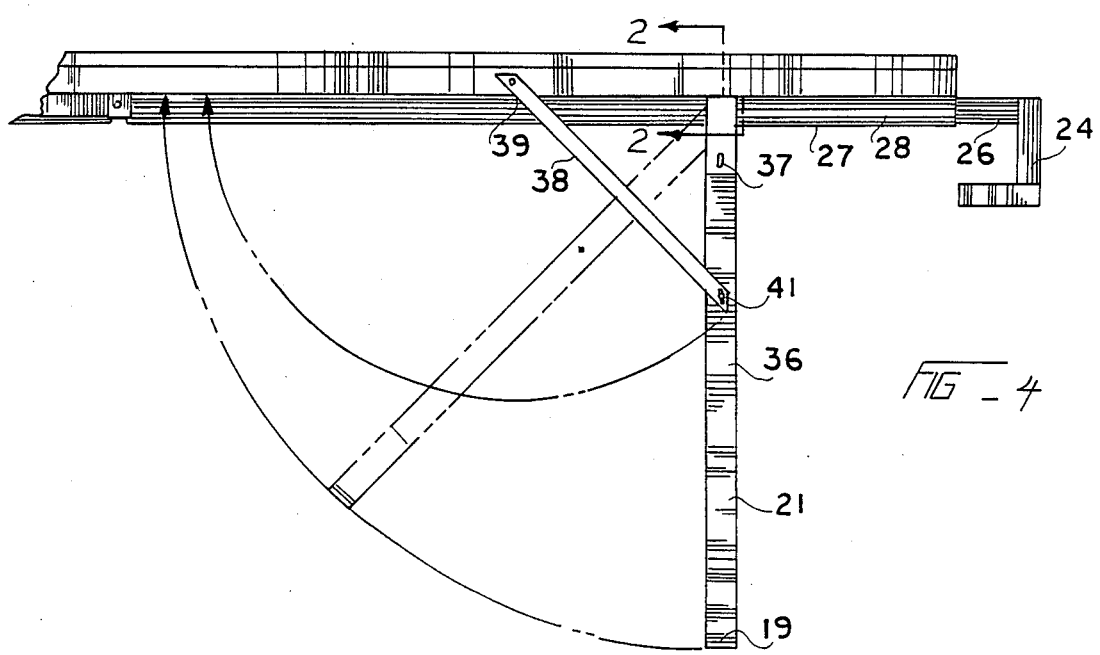

CUTTING TABLE

BACKGROUND OF THE INVENTION

This invention pertains to the field of sawing materials used in building construction and comprises a sawing table and motorized hand-circular saw together with appropriate angularly movable saw cut guide facilities therefor, and a novel supporting table assembly which is adapted for releasable rigid attachment to a scaffold, system for use by a carpenter or other worker using the scaffold with the sawing machine and table in a conveniently mounted relationship to the worker's work station.

FIELD OF THE INVENTION

An example of the field of use of such a machine would be a scaffold mounted work table disposed adjacent a work station for use in the saw cutting of aluminum siding for home construction purposes. Additionally, the work table may be raised in elevation contemporaneously with elevational movement of the scaffold.

SUMMARY OF THE INVENTION

The sawing table is of a unique character and improved design for supporting a workpiece and the motor driven portable electric circular saw which is a conventional commercially available type, hence not described herein, it comprises the additional structure in addition to the bedplate for supporting the workpiece of suitable guides mounted thereon for positioning both the workpiece, and the portable saw in a manner to facilitate the provision of saw cuts on the workpiece at substantially any angle relative to the longitudinal axis of the workpiece. The guide devices may be quickly positioned and locked in place with respect to the bedplate of the sawing table.

It will be apparent that repetitive cuts may be made to a plurality of workpieces with consistent accuracy and yet the apparatus is readily adaptable to variations in desired cutting angles by merely readjusting the positioning of the saw guides and making a subsequent cut or sequentially a plurality of saw cuts with the same degree or accuracy as all of the preceding cuts.

This invention is further directed to the provision of clamping elements which are attached to the saw table and include facilities for accomplishing rapid engagement and thereafter rigid yet releasable attachment to the scaffold structure utilized by the carpenter or other worker in moving from one location to another along the height of the scaffold support when the worker is attaching siding or other structural elements to the building under construction or reconstruction as the case may be.

DESCRIPTION OF THE RELATED PRIOR ART

The prior art is replete with examples of bedplate and saw guiding facilities for use with motor-driven hand circular saws. The following are typical examples of such portable sawing devices: A. L. Bassett, U.S. Pat. No. 3,935,777; E. H. Van Cleave, U.S. Pat. No. 3,955,456.

The most relevant sawing apparatus teaching structure of the aforementioned types for sawing devices with table-like support structure incorporated therewith are: M. P. Stubbs, U.S. Pat. No. 3,896,692; J. J. McNamee, U.S. Pat. No. 4,327,619.

The aforementioned McNamee patent is considered to be the most pertinent for the teaching of a foldable leg system for support of the bedplate and guide assembly structure. This prior art patent does not, however, provide any teaching of instrumentalities for attachment of the apparatus to a scaffold as is contemplated by applicant's new and novel apparatus and unique relationships of attachment elements.

The novel devices of the applicant's design provide for the elevation of the saw table assembly by usage of the same jacks or other elevating apparatus as utilized for raising and lowering the scaffold to which the applicant's saw table may be rigidly attached as well as being readily detached therefrom.

It is a feature of this invention to provide a saw table and saw machine which is foldable, readily portable and attachable to a scaffold by a single workman and which incorporates facilities for storage and ready service of uncut work pieces at the workstation of the worker.

In correlation with the foregoing feature, it is also an object of the invention to provide an arrangement of the sawing table apparatus relative to the scaffold wherein the effect of a safety guard rail structure is provided for the worker along an area which is normally most susceptible to falling accidents by workers working on an open-sided scaffold.

Particular objects and features of the invention disclosed herein include increased accuracy, enhanced safety, improved convenience in sawing operations by virtue of improved mutual cooperation of the various elements of the apparatus and a scaffold to which the sawing, storage of uncut workpiece materials and work station of the worker are disposed in a contiguous relationship, thereby providing maximum convenience and overall improvement in the efficiency and quality of the work accomplishment of the worker.

Another object of the invention relates to the facility with which the sawing table may be elevated or lowered by a workman at the work station when it is desired to raise or lower the scaffold by actuation of the pump jack for the scaffold, since by virtue of the flexibility of the clamping device for the work table as one end of the scaffold is raised or lowered, the table will be moved therewith, with the same relationships therebetween, also being accomplished when the opposite end of the scaffold is moved from its thus tilted position back to a horizontal position for continuation of work by the workman at the newly established elevation.

A further major object resides in the foldability of the saw table, thereby providing portability and ease of loading and unloading for moving the equipment from one work location on the job to another and from job to job as well as providing for rapid set up on the job, and striking down for storage.

It is an additional object of the invention to provide a system of sawing apparatus and scaffold mounting elements in a new and novel structural arrangement which provides substantially all of the advantages of the prior art saw and bedplate apparatus of the same or similar character while substantially obviating the shortcomings of not being able to move the saw table with the scaffold and other operational disadvantages of equipment for the same general purposes heretofore or now in general use.

Other objects, feature and attendant advantages of this invention will be apparent or become obvious when considered in view of the following description and when taken with reference to the accompanying draw-

BRIEF DESCRIPTION OF THE DRAWINGS

FIG. 1 is an isometric view of the saw table structure shown in its attached relationship to a scaffold which is contiguous thereto.

FIG. 2 is a side sectional elevation view of the saw table and bedplate assembly, taken along line 2—2 of FIG. 4.

FIG. 3 is a fragmentary isometric view of the attachment latch utilized for rigid mutual engagement of the saw table and scaffold.

FIG. 4 is a fragmentary front elevation view illustrating the location of the attachment latch of FIG. 3 relative to the bedplate of the table and further indicating the path of travel of the leg folding elements.

DESCRIPTION OF THE PREFERRED EMBODIMENT

Figure 8:
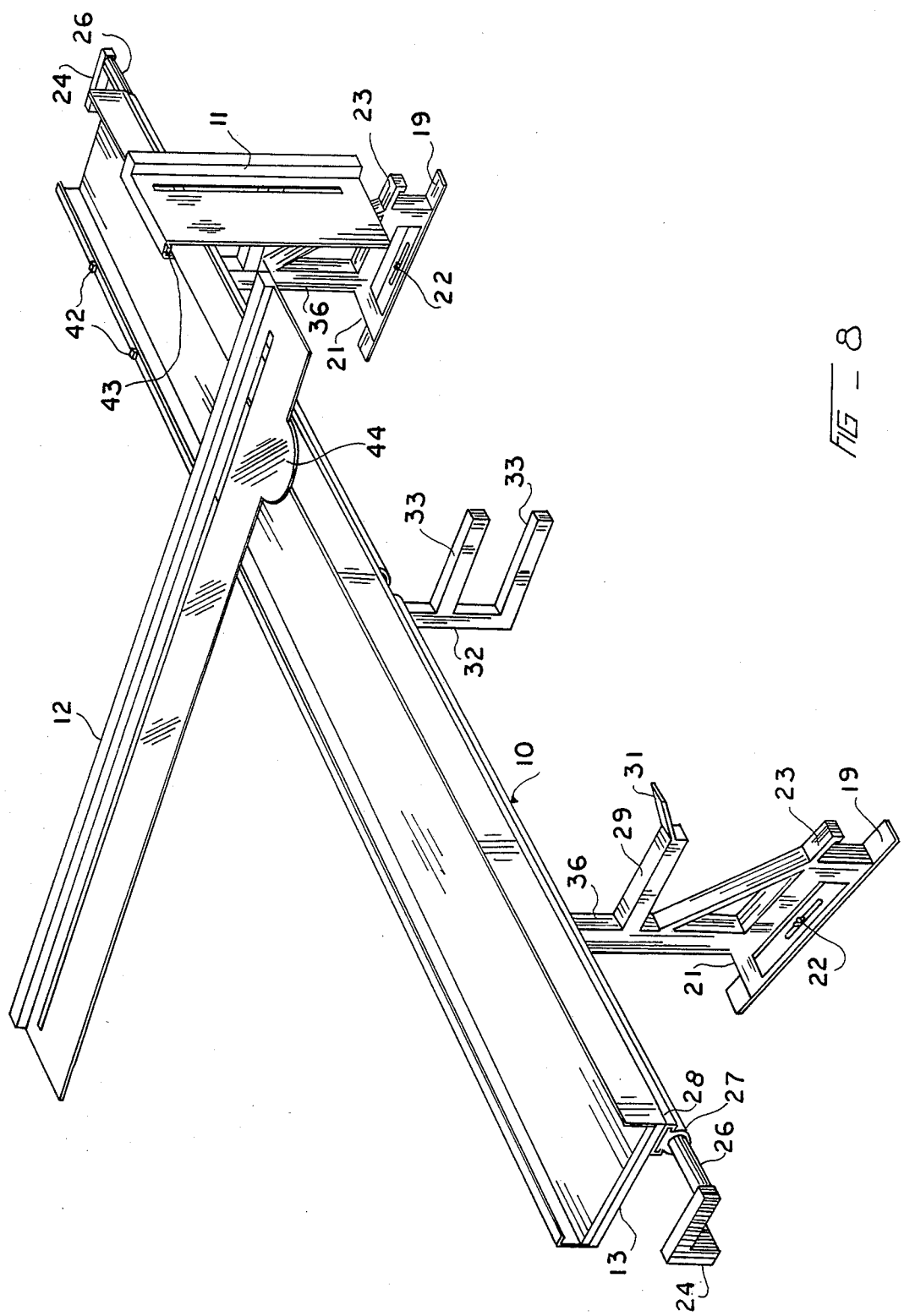
FIG. 8 is an isometric view of the saw table structure as it might be used on the ground or erected for attachment to the scaffold and viewed from the opposite side, relative to the showing illustrated in FIG. 1.

Referring now in detail to the drawings and more particularly to FIGS. 1 and 8, which illustrate respectively the front and rear views of the saw table as observed by a viewer looking toward the side of a building upon which work is to be performed.

As aforestated the sawing operation is accomplished by a conventional hand type electrical circular saw, which while used with the saw table of the invention is not herein illustrated. It is also feasible to utilize a reciprocating blade saw with the instant saw table.

The saw table assembly generally is indicated at 10 and the associated saw guides 11 and 12 are shown in erected form in FIG. 8 while the assembled relationship of saw table 10, bedplate 13 and scaffold platform 14 is illustrated in FIG. 1. The scaffold platform 14 is supported by vertically disposed pillars or posts 16. The horizontal scaffold platform 14 is comprised of a pair of mutually spaced longitudinal deck beams 17 which may be extruded I-beams and fastened together by ladder-like rung elements at 18 in a conventional manner well known in the art. The spacing blocks or spacer rungs as the case may be, are not shown since the scaffold platform 14 is a commercially available item of manufacture, which bears a general similarity or resemblance to an aluminum ladder.

Insofar as the instant invention is illustrated, the scaffold platform is shown in a phantom outline in a diagrammatic manner in FIG. 1 wherein it is shown as a plurality of spaced longitudinally disposed stringer 17. In this regard it is essential that the first "I" beam or stringer 17, as the case may be, be located adjacent to the saw table base and be spaced from the next adjacent stringer of the scaffold platform 14 or deck board in order that the longitudinally slidable base portion 19 of the foot member 21, which may be locked by a bolt or other type fastener 22 such as a toggle clamp of the like, may interact with the hook-shaped projection 23 of the base foot 19 whereby the table may be releasably attached to the first stringer or "I" beam at 17 of the scaffold platform 14.

The saw table attachment instrumentalities also include a pair of shaped engagement members 24 disposed at the opposite ends of the bed plate 13 for releasable locking engagement with the two end posts 16 of the scaffold support. The details of the hook-shaped post locking devices are illustrated with greater particularity in FIG. 3 wherein a cylindrical bar 26 is received for telescopically slidable movement into and out of a tubular element 27 which is fixedly attached to a mounting plate member 28.

The plate 19 may be retracted after engagement of hook-shaped member 23 which is placed over the adjacent scaffold "I" beam or stringer 17 and the post locks 24 engage the posts 16. The plates 19 in the extended position thereof serve the purpose of stabilizing the table assembly when it is being used on the ground rather than on the scaffold.

The saw table assembly 10 additionally includes laterally extending ready service supports 29 for uncut siding panels or the like which supports are configured as shown in FIGS. 1 and 2 with an upwardly and outwardly extending terminal end portion 31. An additional L-shaped intermediate support element 32 which may have one or two laterally extending projections 33, as desired, depending upon whether a single or dual ready service storage arrangement is desired is shown as a dual unit only in FIG. 1. The support element 32 is pivotally mounted for rotation about pin 34 to facilitate folding for storage.

Figure 6:
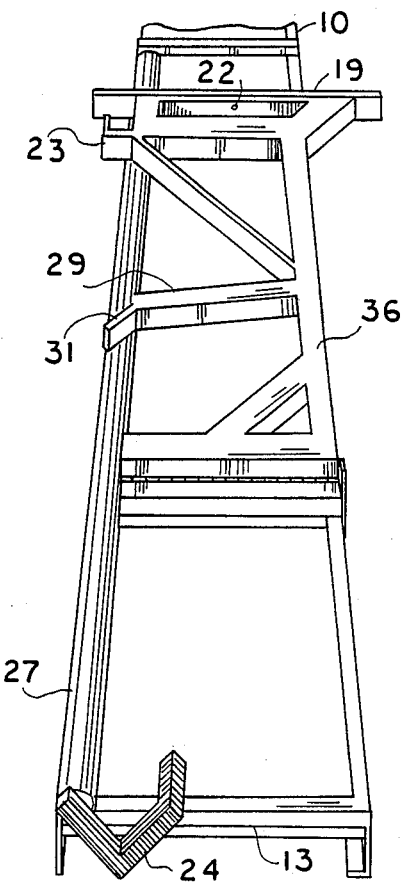
FIG. 6 is a fragmentary pictorial view of the apparatus of FIG. 1 in a folded condition.

Referring now to FIG. 4 the arrangement of the folding foot 21 and upright table leg 36 is shown as being pivotally mounted whereby it is foldable about a removable toggle ended pivot pin 37. It will be observed that a diagonal brace 38 is pivoted at 39 and releasably bolted at 41 to facilitate knock down collapsing of the legs for transporting or storage of the saw table assembly. FIG. 6 illustrates in fragmentary form the folded arrangement of the assembly for one half thereof.

The details of the notch 42 in the rear flange of the bedplate for rigidly receiving a mating block not shown but located on the underside of the angle cutting saw guide 12 is located at 42. A similar notch and mating block (not shown) is provided for the 90 degree cross cutting guide 11.

Figure 5:
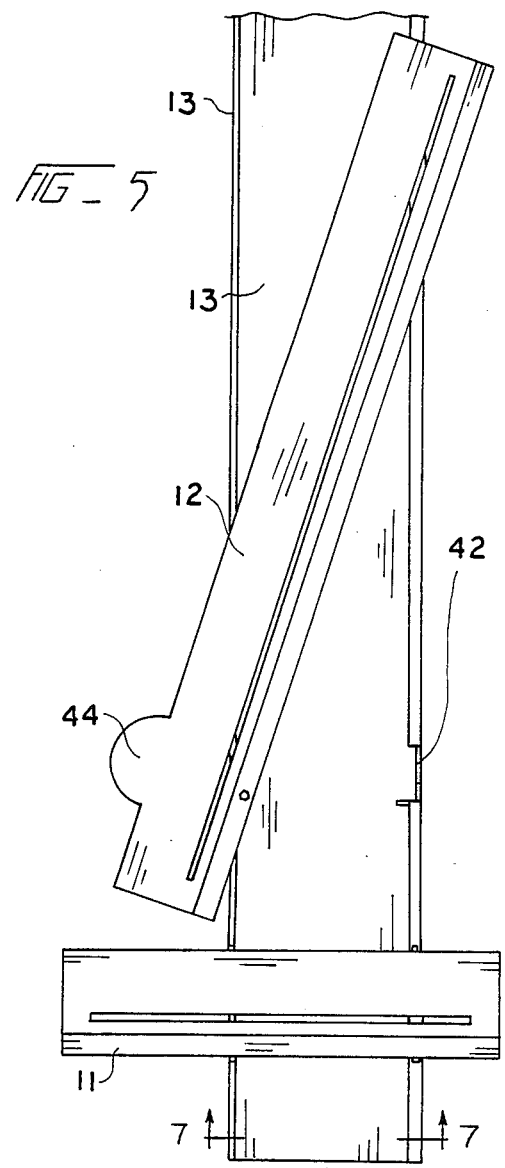
FIG. 5 is a plan view of the bedplate and saw guide devices.
Figure 7:
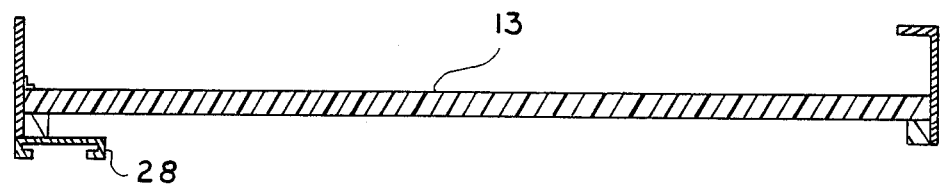
FIG. 7 is a cross sectional elevation view of the bedplate taken along line 7—7 of FIG. 5.

Referring now to FIG. 5, a semi-circular plate portion 44 is provided on the saw guide 12 in order to prevent locating block 43 on guide 12 from interfering with the notch at 42 when guide 12 is moved from one cutting angle to another.

Obviously many modifications and variations of the present invention are possible in light of the above teachings. It is therefore to be understood that within the scope of the appended claims the inventions may be practiced otherwise than as specifically described.

What is claimed as new and desired to be secured by Letters Patent of the United States is:

1. A scaffold mountable saw table assembly comprising in combination, a bedplate, a crosscut sawing guide and an angular sawing guide, each being adapted for movable mounting relative to said bedplate, a plurality of spaced, retractably mounted table leg members, a plurality of locking means on said bedplate allowing for engagement with vertical posts of a scaffold to which said saw table may be mounted, and a plurality of scaffold platform engaging hooks disposed on said table leg members for releasable attachment to a side of a longitudinally extending rail "I" beam of a scaffold platform.

2. the saw table of claim 1, further comprising a plurality of ready service workpiece support members mounted on said saw table leg members in spaced adjacency to and below said bed plate.

3. The saw table assembly of claim 2 wherein said locking means are telescopically mounted to said bed plate at the opposite ends therefor for extension.

4. The saw table assembly of claim 3 further comprising in combination at least one additional ready service workpiece storage support disposed intermediate said table leg mounted ready service workpiece support members.

5. The saw table assembly of claim 4 being further characterized by said intermediate storage support having a plurality of ready service workpiece supporting members disposed in depending tandem relationship below said bedplate.

6. The saw table assembly of claim 1, being further provided with a plurality of longitudinally disposed slidably mounted plate elements, respectively mounted as a foot plate to feet on said table legs and adapted for horizontal movement relative to said platform engaging hooks to cooperate therewith to enhance the locking relationship between said feet of said table legs and the "I" beam of the scaffold platform when said saw table is mounted thereon and being further characterized by rendering said saw table assembly movable in elevation or depression together with contemporaneously accompanying scaffold movement.

* * * * *